United States Patent
Agarwal et al.

(10) Patent No.: US 12,335,852 B2
(45) Date of Patent: Jun. 17, 2025

(54) DETECTION OF PARALLEL OPERATING WI-FI NETWORKS

(71) Applicant: PLUME DESIGN, INC., Palo Alto, CA (US)

(72) Inventors: Nipun Agarwal, Fremont, CA (US); William J. McFarland, Portola Valley, CA (US); Yoseph Malkin, San Jose, CA (US); Na Hyun Ha, Cupertino, CA (US); Adam R. Hotchkiss, Dallas, TX (US); Sandeep Eyyuni, Sunnyvale, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 0 days.

(21) Appl. No.: 18/489,899

(22) Filed: Oct. 19, 2023

(65) Prior Publication Data
US 2024/0049121 A1    Feb. 8, 2024

Related U.S. Application Data

(63) Continuation of application No. 17/745,404, filed on May 16, 2022, now Pat. No. 11,832,170, which is a continuation of application No. 17/078,196, filed on Oct. 23, 2020, now Pat. No. 11,368,903.

(51) Int. Cl.
| | | |
|---|---|---|
| *H04W 4/00* | (2018.01) | |
| *H04W 16/20* | (2009.01) | |
| *H04W 48/16* | (2009.01) | |
| *H04W 68/00* | (2009.01) | |
| *H04W 84/12* | (2009.01) | |

(52) U.S. Cl.
CPC .......... *H04W 48/16* (2013.01); *H04W 16/20* (2013.01); *H04W 68/005* (2013.01); *H04W 84/12* (2013.01)

(58) Field of Classification Search
CPC ... H04W 48/16; H04W 16/20; H04W 68/005; H04W 84/12
USPC ........................................................... 370/338
See application file for complete search history.

(56) References Cited

U.S. PATENT DOCUMENTS

| | | |
|---|---|---|
| 10,051,494 B2 | 8/2018 | Rengarajan et al. |
| 10,341,193 B2 | 7/2019 | Rengarajan et al. |
| 10,470,082 B2 | 11/2019 | Rengarajan et al. |
| 10,554,482 B2 | 2/2020 | Rengarajan et al. |
| 10,554,733 B2 | 2/2020 | Edara et al. |
| 10,687,227 B2 | 6/2020 | Rusackas et al. |
| 10,708,126 B2 | 7/2020 | Singla et al. |
| 2012/0259965 A1 | 10/2012 | Tsuzuki et al. |

(Continued)

OTHER PUBLICATIONS

International Search Report to International Application No. PCT/US2018/055263, mailed Feb. 14, 2019, 5 pages.

*Primary Examiner* — Temica M Beamer
(74) *Attorney, Agent, or Firm* — Nicholas Martin; Greenberg Traurig, LLP

(57) ABSTRACT

Systems and methods of detecting a parallel Wi-Fi network or a parallel Wi-Fi access point include operating a new Wi-Fi network at a location; analyzing Wi-Fi at the location; determining whether there is a parallel Wi-Fi network or a parallel Wi-Fi access point operating at the location with the new Wi-Fi network based on the analyzing; and, responsive to determining there is the parallel Wi-Fi network or the parallel Wi-Fi access point at the location, performing one or more of i) causing resolution of the parallel Wi-Fi network or the parallel Wi-Fi access point and ii) providing a notification to a user associated with the location.

20 Claims, 4 Drawing Sheets

(56) References Cited

U.S. PATENT DOCUMENTS

| | | |
|---|---|---|
| 2014/0328190 A1 | 11/2014 | Martin et al. |
| 2015/0327272 A1 | 11/2015 | Fink et al. |
| 2015/0341797 A1 | 11/2015 | Madan et al. |
| 2015/0382208 A1 | 12/2015 | Elliott et al. |
| 2016/0043962 A1 | 2/2016 | Kim et al. |
| 2016/0254968 A1 | 9/2016 | Ebtekar et al. |
| 2017/0272965 A1 | 9/2017 | Kumar et al. |
| 2018/0324607 A1 | 11/2018 | Renjarajan et al. |
| 2019/0342795 A1 | 11/2019 | McFarland et al. |

DETECTION OF PARALLEL OPERATING WI-FI NETWORKS

CROSS-REFERENCE TO RELATED APPLICATION(S)

The present disclosure is a continuation of U.S. patent application Ser. No. 17/745,404, filed May 16, 2022, which is a continuation of U.S. patent application Ser. No. 17/078,196, filed Oct. 23, 2020, now U.S. Pat. No. 11,368,903, the contents of which are incorporated by reference in their entirety.

FIELD OF THE DISCLOSURE

The present disclosure generally relates to networking systems and methods. More particularly, the present disclosure relates to detection of parallel operating Wi-Fi networks.

BACKGROUND OF THE DISCLOSURE

Conventional Wi-Fi networks are deployed by users in their residences to provide network connectivity to various devices (e.g., mobile devices, tablets, televisions, Internet of Things (IoT) devices, laptops, media players, and the like). The users obtain network connectivity from their service provider, e.g., Multiple Systems Operators (MSOs), wireless providers, telecom providers, etc. Often the users have an existing Wi-Fi network and add a new, upgraded Wi-Fi network to improve functionality. The existing Wi-Fi network can include Wi-Fi that is integrated into a modem/router/gateway from the service provider. When the new, upgraded Wi-Fi network is added, it is common to use the same Service Set Identifier (SSID) so that the user does not have to change the Wi-Fi configuration of various Wi-Fi client devices. For example, a typical home can have tens of devices that connect, and changing the SSID for each of these is far more complicated than keeping the same SSID when upgrading Wi-Fi equipment. Problematically, users often do not decommission or turn of the existing Wi-Fi network. This is especially common where the existing Wi-Fi network is integrated into the modem/router/gateway from the service provider. This leads to a parallel Wi-Fi network with the same SSID operating in the same location.

BRIEF SUMMARY OF THE DISCLOSURE

The present disclosure relates to detection of parallel operating Wi-Fi networks. Specifically, the objective is to identify parallel operating Wi-Fi networks to remove one of the networks to improve performance. The present disclosure includes cloud-based Wi-Fi network management that can include various processes to detect parallel Wi-Fi networks. Once detected, a customer can be notified with instructions on how to remove the parallel Wi-Fi network, leading to improved performance on the remaining Wi-Fi network. Examples of parallel networks include a so-called "evil twin" which is another Wi-Fi network, operating in parallel, with the same SSID; a so-called "evil brother" which is another Wi-Fi network, operating in parallel, with a different SSID; and a so-called "lonely network" which is a new Wi-Fi network with zero or very few clients, presumably because many other devices are on a parallel network.

In various embodiments, the present disclosure includes a method including steps, a controller configured to implement the steps, and a non-transitory computer-readable medium with instructions that cause a processor to perform the steps. The steps relate to detecting a parallel Wi-Fi network or a parallel Wi-Fi access point. The steps include, subsequent to installing a new Wi-Fi network at a location, detecting whether there is a parallel Wi-Fi network or a parallel Wi-Fi access point operating at the location with the new network; and, responsive to detecting the parallel Wi-Fi network or the parallel Wi-Fi access point operating, performing one or more of causing resolution of the parallel Wi-Fi network or the parallel Wi-Fi access point and providing a notification to a user associated with the location based on the detecting.

The steps can further include determining a type of the parallel Wi-Fi network or the parallel Wi-Fi access point, wherein the resolution is based on the type and the notification includes the type. The steps can further include performing the detecting responsive to any of interference, initial turn up of the new Wi-Fi network, and any communication from the user including a phone call, a mobile application message to customer support, an email message, a response to a survey, and an in-person communication with an on-site technician. The steps can further include performing the detecting responsive to detecting the new Wi-Fi network has zero or very few Wi-Fi client devices connected thereto, presumably because the Wi-Fi client devices are on the parallel Wi-Fi network or the parallel Wi-Fi access point.

The notification can include details for the user to turn off the parallel Wi-Fi network or the parallel Wi-Fi access point. The notification can include details for the user to remove profiles for the parallel Wi-Fi network or the parallel Wi-Fi access point in Wi-Fi client devices at the location. The resolution can include disabling the parallel Wi-Fi network or the parallel Wi-Fi access point remotely. The resolution can include notifying a service provider of the user to cause disabling the parallel Wi-Fi network or the parallel Wi-Fi access point. Subsequent to the performing, repeating the detecting to determine if the parallel Wi-Fi network or the parallel Wi-Fi access point remain.

The steps can further include providing a dashboard that displays locations where the parallel Wi-Fi network or the parallel Wi-Fi access point have been detected. The steps can further include causing initiation of support for a service provider based on the detecting.

The parallel Wi-Fi network or the parallel Wi-Fi access point can have a same Service Set Identifier (SSID) or a different SSID as the new network. The detecting can be based on an access point in the new Wi-Fi network detecting another access point that is not part of the new Wi-Fi network but that has the same SSID. The detecting can be based on detecting Wi-Fi client devices disappearing and reappearing on the new Wi-Fi network, factoring whether those Wi-Fi client devices are mobile or non-mobile devices. The detecting can be based on a combination of an access point in the new Wi-Fi network detecting another access point that is not part of the new Wi-Fi network but that has the same SSID, and detecting Wi-Fi client devices disappearing and reappearing on the new Wi-Fi network, with at least some of the Wi-Fi client devices being non-mobile devices.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to detection of parallel operating Wi-Fi networks. Specifically, the objective is to identify parallel operating Wi-Fi networks to remove one of the networks to improve performance. The present disclosure includes cloud-based Wi-Fi network management that can include various processes to detect parallel Wi-Fi networks. Once detected, a customer can be notified with instructions on how to remove the parallel Wi-Fi network, leading to improved performance on the remaining Wi-Fi network. Examples of parallel networks include a so-called "evil twin" which is another Wi-Fi network, operating in parallel, with the same SSID; a so-called "evil brother" which is another Wi-Fi network, operating in parallel, with a different SSID; and a so-called "lonely network" which is a new Wi-Fi network with zero or very few clients, presumably because many other devices are on a parallel network.

Distributed Wi-Fi System

Figure 1:
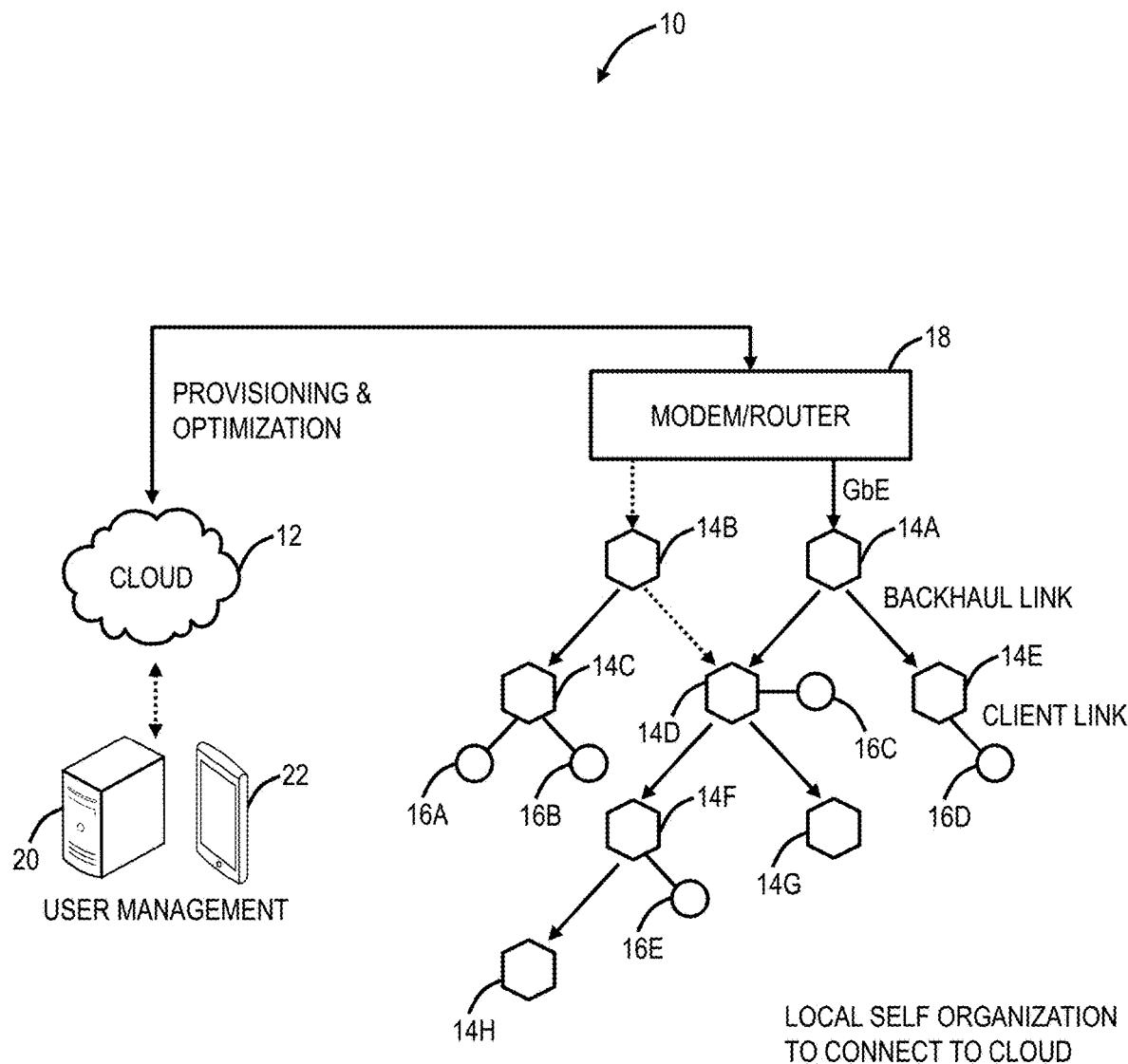
FIG. 1 is a network diagram of a distributed Wi-Fi system with cloud-based control and management.

FIG. 1 is a network diagram of a distributed Wi-Fi system 10 with control via a cloud 12 service. The distributed Wi-Fi system 10 can operate in accordance with the IEEE 802.11 protocols and variations thereof. The distributed Wi-Fi system 10 includes a plurality of access points 14 (labeled as access points 14A-14H), which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 can be for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, IoT devices, or any network-enabled device. For external network connectivity, one or more of the access points 14 can be connected to a modem/router 18, which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This cloud 12 service can provide control via servers 20 that can be reached across the Internet and accessed remotely, such as through an application ("app") running on a user device 22. The running of the distributed Wi-Fi system 10, therefore, becomes what is commonly known as a "cloud service." The servers 20 are configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an example aspect, the distributed Wi-Fi system 10 includes cloud-based control (with a cloud-based controller or cloud service in the cloud) to optimize, configure, and monitor the operation of the access points 14 and the Wi-Fi client devices 16. This cloud-based control is contrasted with a conventional operation that relies on a local configuration, such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an example gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
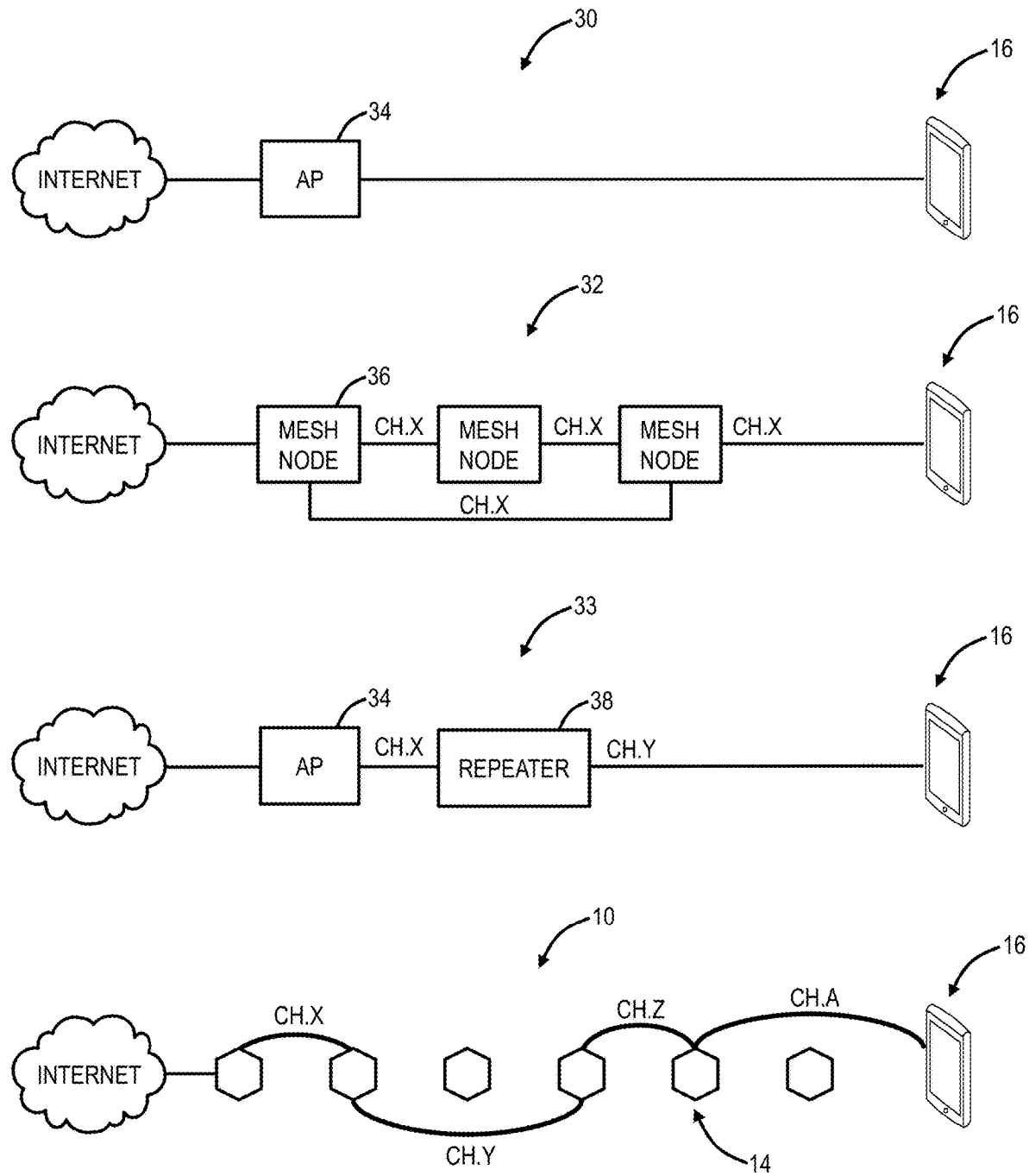
FIG. 2 is a network diagram of differences in the operation of the distributed Wi-Fi system of FIG. 1 relative to a conventional single access point system, a Wi-Fi mesh network, and a Wi-Fi repeater network.

FIG. 2 is a network diagram of differences in the operation of the distributed Wi-Fi system 10 relative to a conventional single access point system 30, a Wi-Fi mesh network 32, and a Wi-Fi repeater network 33. The single access point system 30 relies on a single, high-powered access point 34, which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36, which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Chs. X, Y, Z, A), and also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33, which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops, unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an example aspect, the servers 20 in the cloud 12 are configured to optimize channel selection for the best user experience.

Of note, the present disclosure for intelligent monitoring is not limited to the distributed Wi-Fi system 10 but contemplates any of the Wi-Fi networks 10, 30, 32, 33, with monitoring through the cloud 12. For example, different vendors can make access points 14, 34, mesh nodes 36, repeaters 38, etc. However, it is possible for unified control via the cloud using standardized techniques for communication with the cloud 12. One such example includes OpenSync, sponsored by the Applicant of the present disclosure and described at www.opensync.io/documentation. OpenSync is cloud-agnostic open-source software for the delivery, curation, and management of services for the modern home. That is, this provides standardization of the communication between devices and the cloud 12. OpenSync acts as silicon, Customer Premises Equipment (CPE), and cloud-agnostic connection between the in-home hardware devices and the cloud 12. This is used to collect measurements and statistics from the connected Wi-Fi client devices 16 and network management elements, and to enable customized connectivity services.

Cloud-Based Wi-Fi Management

Conventional Wi-Fi systems utilize local management, such as where a user on the Wi-Fi network connects to a designated address (e.g., 192.168.1.1, etc.). The distributed Wi-Fi system 10 is configured for cloud-based management via the servers 20 in the cloud 12. Also, the single access point system 30, the Wi-Fi mesh network 32, and the Wi-Fi repeater network 33 can support cloud-based management as described above. For example, the APs 34 and/or the mesh nodes 36 can be configured to communicate with the servers 20 in the cloud 12. This configuration can be through a software agent installed in each device or the like, e.g., OpenSync. As described herein, cloud-based management includes reporting of Wi-Fi related performance metrics to the cloud 12 as well as receiving Wi-Fi-related configuration parameters from the cloud 12. The systems and methods contemplate use with any Wi-Fi system (i.e., the distributed Wi-Fi system 10, the single access point system 30, the Wi-Fi mesh network 32, and the Wi-Fi repeater network 33, etc.), including systems that only support reporting of Wi-Fi related performance metrics (and not supporting cloud-based configuration).

The cloud 12 utilizes cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud."

Access Point

Figure 3:
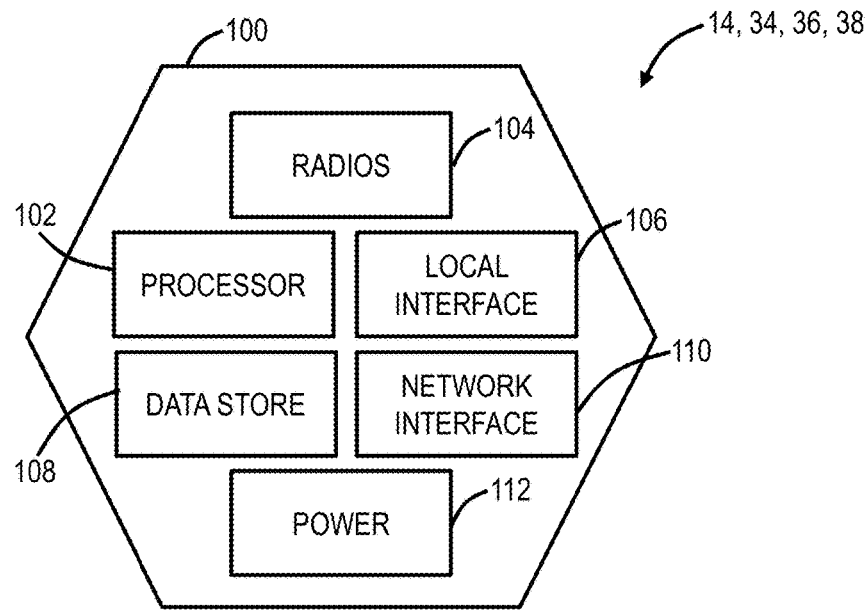
FIG. 3 is a block diagram of functional components of the access point.

FIG. 3 is a block diagram of functional components of the access point 14, 34, 36, 38. The access point 14 includes a physical form factor 100 which contains a processor 102, a plurality of radios 104, a local interface 106, a data store 108, a network interface 110, and power 112. It should be appreciated by those of ordinary skill in the art that FIG. 3 depicts the access point 14 in an oversimplified manner, and a practical embodiment may include additional components and suitably configured processing logic to support features described herein or known or conventional operating features that are not described in detail herein.

In an exemplary embodiment, the form factor 100 is a compact physical implementation where the access point 14 directly plugs into an electrical socket and is physically supported by the electrical plug connected to the electrical socket. This compact physical implementation is ideal for a large number of access points 14 distributed throughout a residence. The processor 102 is a hardware device for executing software instructions. The processor 102 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an exemplary embodiment, the processor 102 may include a mobile-optimized processor such as optimized for power consumption and mobile applications.

The radios 104 enable wireless communication in the distributed Wi-Fi system 10. The radios 104 can operate according to the IEEE 802.11 standard. The radios 104 include address, control, and/or data connections to enable appropriate communications on the distributed Wi-Fi system 10. As described herein, the access point 14 includes a plurality of radios to support different links, i.e., backhaul links and client links. The optimization 70 determines the configuration of the radios 104 such as bandwidth, channels, topology, etc. In an exemplary embodiment, the access points 14 support dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an exemplary embodiment, the access points 14 can also include the local interface 106 allowing connectivity to the user device 22 (or a Wi-Fi client device 16) for onboarding to the distributed Wi-Fi system 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The network interface 104 may be used to enable the access point 14 communicate to the modem/router 18. Also, the network interface 104 can be used to provide local connectivity to a Wi-Fi client device 16 or user device 22. For example, wiring in a device to an access point 14 can provide network access to a device which does not support Wi-Fi. In an exemplary embodiment, all of the access points 14 in the distributed Wi-Fi system 10 include the network interface 110. In another exemplary embodiment, select access points 14 which connect to the modem/router 18 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 20 via the cloud. The processor 102 and the data store 108 may be configured to implement the various processes, algorithms, methods, techniques, etc. described herein.

Cloud Server and User Device

Figure 4:
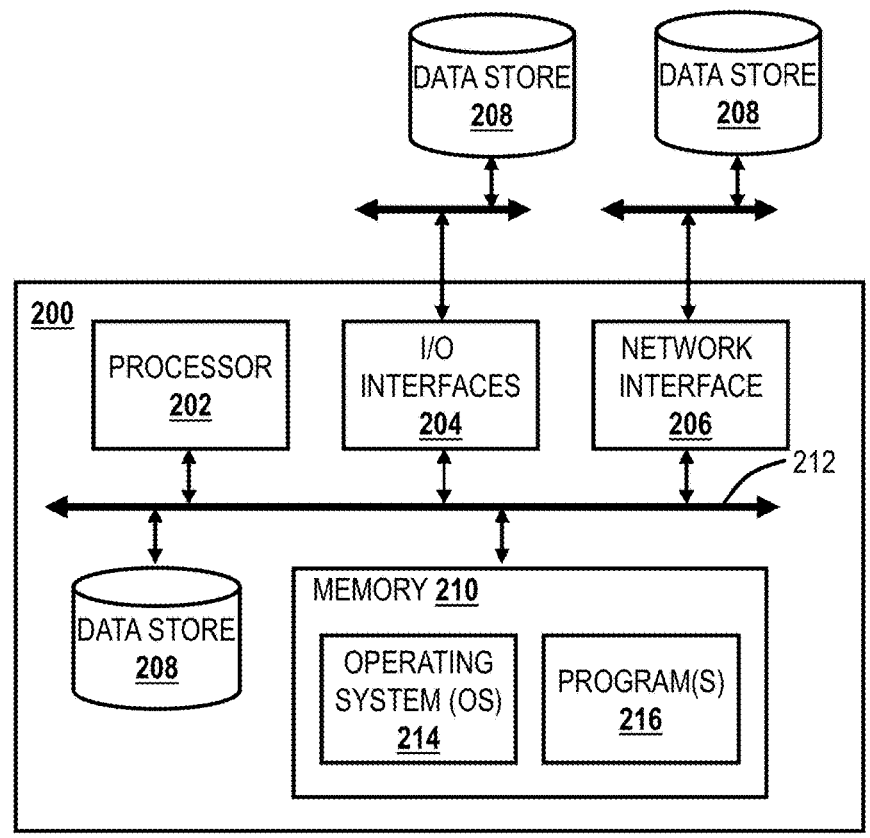
FIG. 4 is a block diagram of functional components of the server, the Wi-Fi client device, or the user device.

FIG. 4 is a block diagram of functional components of the server 20, the Wi-Fi client device 16, or the user device 22. FIG. 4 illustrates functional components which can form any of the Wi-Fi client device 16, the server 20, the user device 22, or any general processing device. The server 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 20 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 20, a semiconductor-based microprocessor (in the form of a microchip or chip set), or generally any device for executing software instructions. When the server 20 is in operation, the processor 202 is configured to execute software stored within the memory 210, to communicate data to and from the memory 210, and to generally control operations of the server 20 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 20 to communicate on a network, such as the cloud 12. The network interface 206 may include, for example, an Ethernet card or adapter (e.g., 10BaseT, Fast Ethernet, Gigabit Ethernet, 10 GbE) or a wireless local area network (W LAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 20 such as, for example, an internal hard drive connected to the local interface 212 in the server 20. Additionally, in another embodiment, the data store 208 may be located external to the server 20 such as, for example, an external hard drive connected to the I/O interfaces 204 (e.g., SCSI or USB connection). In a further embodiment, the data store 208 may be connected to the server 20 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Definitions

Again, the present disclosure relates to detection of parallel operating Wi-Fi networks. Specifically, the objective is to identify parallel operating Wi-Fi networks to remove one of the networks or access points to improve performance. The following terminology is utilized herein.

Evil twin is another Wi-Fi network, operating in parallel at the same location, with the same SSID. Here, the location can be a residence. There is a Wi-Fi network of interest installed (a "new" Wi-Fi network) and there is another Wi-Fi network that is operating in parallel (a "parallel" Wi-Fi network or the evil twin. Each of these Wi-Fi networks can be any of the Wi-Fi networks 10, 30, 32, 33. For example, the evil twin can be the Wi-Fi network 30, and the new Wi-Fi network can be the Wi-Fi network 10, 32, 33, etc. Other embodiments are contemplated. The typical case here is the parallel Wi-Fi network is operating, such as integrated with the modem/router 18 or another configuration. The parallel Wi-Fi network is typically installed by a service provider (e.g., cable company). The new Wi-Fi network is typically installed later, i.e., an upgrade. Again, a typical use case is the owner installs the new Wi-Fi network to upgrade or provide better coverage. As such, this is typically a multi-access point configuration, such as any of the Wi-Fi networks 10, 32, 33. For convenience, users typically add the new Wi-Fi network with an existing SSID as this reduces configuration of the Wi-Fi client devices 16. Disadvantageously, often users leave the parallel Wi-Fi network as-is leading to performance issues, namely two parallel Wi-Fi networks operating at the same location (residence).

An evil brother is an access point 14, 34, 36, 38 that is operating at a same location as a new Wi-Fi network, but with a different SSID. The evil brother can be a single access point or an entirely separate Wi-Fi network. That is, the evil brother is the same as the evil twin except that it has a separate SSID. A use case here can be where the new Wi-Fi network is added after the fact with a different SSID from the parallel network.

Thus, an evil twin is a parallel Wi-Fi network or a parallel access point operating at a same location as a new Wi-Fi network with the same SSID. An evil brother is a parallel Wi-Fi network or parallel access point operating at a same location as the new Wi-Fi network with a different SSID. The new Wi-Fi network is referred to as "new" because it has been added after the parallel network, presumably for an upgrade.

Finally, a lonely network is a result of having the parallel Wi-Fi network or parallel access point at the same location. That is a lonely is a new Wi-Fi network with zero or very few Wi-Fi client devices 16, presumably because many other devices are on a parallel network.

Of course, there is no need to operate parallel Wi-Fi networks at the same location. The objective of the present disclosure is to provide techniques for identifying the parallel networks for the purpose of remediation, specifically removing, turning off, and/or decommissioning the parallel networks.

Parallel Network Detection and Resolution

Figure 5:
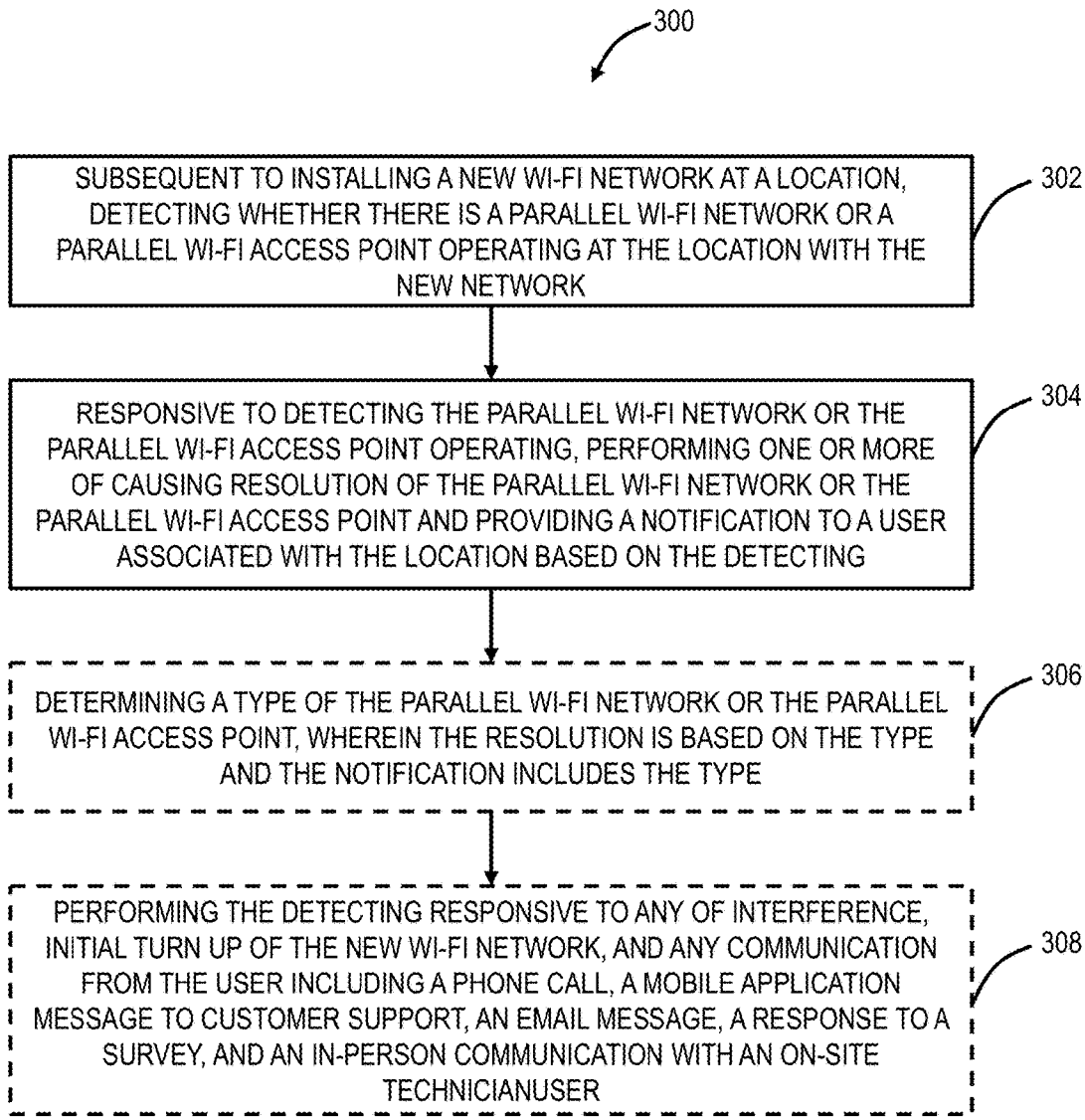
FIG. 5 is a flowchart of a parallel network detection and resolution process.

FIG. 5 is a flowchart of a parallel network detection and resolution process 300. The parallel network detection process 300 contemplates implementation as a method with steps, via a server 200 or the like with a processor configured to implement the steps, and via a non-transitory computer-readable medium having computer readable code stored thereon for programming a processor to perform the steps.

The steps include, subsequent to installing a new Wi-Fi network at a location, detecting whether there is a parallel Wi-Fi network or a parallel Wi-Fi access point operating at the location with the new network (step 302); and responsive to detecting the parallel Wi-Fi network or the parallel Wi-Fi access point operating, performing one or more of causing resolution of the parallel Wi-Fi network or the parallel Wi-Fi access point and providing a notification to a user associated with the location based on the detecting (step 304). The steps can further include determining a type of the parallel Wi-Fi network or the parallel Wi-Fi access point, wherein the resolution is based on the type and the notification includes the type (step 306). The type can be a same SSID, a different SSID, an evil twin, an evil brother, etc.

The steps can further include performing the detecting responsive to any of interference, initial turn up of the new Wi-Fi network, and any communication from the user including a phone call, a mobile application message to customer support, an email message, a response to a survey, and an in-person communication with an on-site technician (step 308). That is, the process 300 can be implemented automatically, e.g., at the initial turn up of the new Wi-Fi network, as well as in response to problems, e.g., interference, the customer service call, etc.

The notification can include details for the user to turn off the parallel Wi-Fi network or the parallel Wi-Fi access point. The notification can include details for the user to remove profiles for the parallel Wi-Fi network or the parallel Wi-Fi access point in Wi-Fi client devices at the location. That is, the resolution flow of the process 300 is to remove the parallel network to prevent any issues. That is, to notify a customer to turn off the parallel network, to notify the customer to remove profiles for parallel network from all devices at the location, to notify the carrier to disable the parallel network, to notify the carrier to contact customer to take action, and the like.

In an embodiment, the parallel Wi-Fi network or the parallel Wi-Fi access point has a same Service Set Identifier (SSID) as the new network. The detecting can be based on an access point in the new Wi-Fi network detecting another access point that is not part of the new Wi-Fi network but that has the same SSID. The detecting can be based on detecting Wi-Fi client devices disappearing and reappearing on the new Wi-Fi network, with at least some of the Wi-Fi client devices being non-mobile devices. Also, the detecting can be based on a combination of an access point in the new Wi-Fi network detecting another access point that is not part of the new Wi-Fi network but that has the same SSID, and detecting Wi-Fi client devices disappearing and reappearing on the new Wi-Fi network, with at least some of the Wi-Fi client devices being non-mobile devices.

In another embodiment, the parallel Wi-Fi network or the parallel Wi-Fi access point has a different Service Set Identifier (SSID) as the new network. The detecting can be based on an access point in the new Wi-Fi network detecting another access point that is not part of the new Wi-Fi network having a strong signal indicative of being at the same location. The detecting can be based on detecting Wi-Fi client devices disappearing and reappearing on the new Wi-Fi network, with at least some of the Wi-Fi client devices being non-mobile devices. Also, the detecting can be based on a combination of an access point in the new Wi-Fi network detecting another access point that is not part of the new Wi-Fi network having a strong signal indicative of being at the same location, and detecting Wi-Fi client devices disappearing and reappearing on the new Wi-Fi network, with at least some of the Wi-Fi client devices being non-mobile devices.

The process 300 can be performed by a controller communicatively coupled to the new Wi-Fi network via the Internet.

Parallel Network Resolution Flow

The objective of the process 300 is detection and resolution of any parallel network, i.e., the parallel Wi-Fi network or the parallel Wi-Fi access point. The resolution can include directly shutting off the parallel network, notifying the customer to turn off parallel network, notifying the customer to remove profiles for parallel network from devices in home, notifying the carrier to disable the parallel network, notifying the carrier to contact customer to take action, and the like. Also, there can be a post step of checking that the issue has been resolved at a later time. This can include performing the process 300 to detect if there is still a parallel network.

As mentioned above, the process 300 can be implemented remotely such as in the cloud 12. The output of the process 300 can include notifications to the customer (i.e., the end user of the new Wi-Fi network) as well as the carrier (i.e., a service provider providing Internet access to the end user). Various different approaches for resolution are contemplated including actions by the end user, by the carrier, etc.

Alarms, Dashboards, and Support

Commonly-assigned U.S. patent application Ser. No. 17/071,015, filed Oct. 15, 2020, and entitled "Intelligent monitoring systems and methods for cloud-based Wi-Fi," the contents of which are incorporated by reference in their entirety, describes various techniques for cloud-based Wi-Fi monitoring to alert, predict, and solve customer issues for service providers. The objectively of this monitoring is to improve customer experience and proactively address issues with the goal of reducing customer churn. The parallel network described herein is one example of an issue that leads to poor Wi-Fi. The various techniques described herein are contemplated with the disclosure in U.S. patent application Ser. No. 17/071,015. That is, the parallel network can be a factor in the Call in Rate (CIR) predictor, customer churn, Net Promoter Score (NPS) predictor, etc.

The process 300 can also be utilized with alarms and a dashboard for visualization. For example, a Graphical User Interface (GUI) can provide a dashboard showing prevalence across networks of homes with suspected parallel networks (this can be part of the Monitor dashboard in U.S. patent application Ser. No. 17/071,015). The dashboard can include a breakdown by type, a listing of locations with issues (Alert), and support information. The listing of locations can be sorted or displayed by severity of type or severity of case as well as highlighting new networks that have just been discovered to have the issue.

The process 300 can also include support related features for the carrier including highlighting there is a suspected parallel network in the location in a Network Operations Center (NOC) display, prefilling a ticket with information about the parallel network, actually entering a ticket based on suspecting a parallel network, and the like.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A method comprising steps:
   detecting a new Wi-Fi network at a location, the new Wi-Fi network associated with a service provider;
   analyzing Wi-Fi at the location;
   determining whether there is a parallel Wi-Fi network or a parallel Wi-Fi access point operating at the location with the new Wi-Fi network based on the analyzing; and
   responsive to determining there is the parallel Wi-Fi network or the parallel Wi-Fi access point at the location, causing resolution of the parallel Wi-Fi network or the parallel Wi-Fi access point, the resolution comprising disabling the parallel Wi-Fi network or the parallel Wi-Fi access point;
   communicating a notification to the service provider, the notification comprising information related to the resolution; and
   confirming that the parallel Wi-Fi network or the parallel Wi-Fi access point have been disabled by repeating the detecting, analyzing and determining steps to determine whether the parallel Wi-Fi network or the parallel Wi-Fi access point remain.

2. The method of claim 1, further comprising:
   determining a type of the parallel Wi-Fi network or the parallel Wi-Fi access point, wherein the resolution is based on the type and the notification includes the type.

3. The method of claim 1, further comprising:
   performing the determining responsive to any of interference, initial turn up of the new Wi-Fi network, and any communication from the user including a phone call, a mobile application message to customer support, an email message, a response to a survey, and an in-person communication with an on-site technician.

4. The method of claim 1, further comprising:
   performing the determining responsive to detecting the new Wi-Fi network has zero or very few Wi-Fi client devices connected thereto, presumably because the Wi-Fi client devices are on the parallel Wi-Fi network or the parallel Wi-Fi access point.

5. The method of claim 1, wherein the notification includes details for the user to turn off the parallel Wi-Fi network or the parallel Wi-Fi access point.

6. The method of claim 1, wherein the resolution further includes removing the parallel Wi-Fi network or the parallel Wi-Fi access point remotely.

7. The method of claim 1, further comprising:
   providing a dashboard that displays locations where the parallel Wi-Fi network or the parallel Wi-Fi access point have been detected.

8. The method of claim 1, wherein the parallel Wi-Fi network or the parallel Wi-Fi access point has a same Service Set Identifier (SSID) as the new Wi-Fi network.

9. The method of claim 1, wherein the parallel Wi-Fi network or the parallel Wi-Fi access point has a different Service Set Identifier (SSID) as the new Wi-Fi network.

10. The method of claim 1, wherein the method is performed by a controller communicatively coupled to the new Wi-Fi network via the Internet.

11. A controller comprising:
    a network interface, one or more processors, and memory comprising instructions that, when executed, cause the one or more processors to:
      responsive to detection of a new Wi-Fi network at a location, analyze Wi-Fi at the location, the new Wi-Fi network associated with a service provider;
      determine whether there is a parallel Wi-Fi network or a parallel Wi-Fi access point operating at the location with the new Wi-Fi network based on the analyzing; and
      responsive to a determination there is the parallel Wi-Fi network or the parallel Wi-Fi access point at the location, cause resolution of the parallel Wi-Fi network or the parallel Wi-Fi access point;
      communicate a notification to the service provider, the notification comprising information related to the resolution; and
      confirm that the parallel Wi-Fi network or the parallel Wi-Fi access point have been disabled by repeating the detecting, analyzing and determining steps to determine whether the parallel Wi-Fi network or the parallel Wi-Fi access point remain.

12. The controller of claim 11, wherein the instructions that, when executed, cause the one or more processors to:

determine a type of the parallel Wi-Fi network or the parallel Wi-Fi access point, wherein the resolution is based on the type and the notification includes the type.

13. The controller of claim 11, wherein the instructions that, when executed, cause the one or more processors to:
perform the determination responsive to any of interference, initial turn up of the new Wi-Fi network, and any communication from the user including a phone call, a mobile application message to customer support, an email message, a response to a survey, and an in-person communication with an on-site technician.

14. The controller of claim 11, wherein the instructions that, when executed, cause the one or more processors to:
performing the determination responsive to detecting the new Wi-Fi network has zero or very few Wi-Fi client devices connected thereto, presumably because the Wi-Fi client devices are on the parallel Wi-Fi network or the parallel Wi-Fi access point.

15. The controller of claim 11, wherein the notification includes details for the user to turn off the parallel Wi-Fi network or the parallel Wi-Fi access point.

16. The controller of claim 11, wherein the resolution further includes removing the parallel Wi-Fi network or the parallel Wi-Fi access point remotely.

17. The controller of claim 11, wherein the instructions that, when executed, cause the one or more processors to:
provide a dashboard that displays locations where the parallel Wi-Fi network or the parallel Wi-Fi access point have been detected.

18. The controller of claim 11, wherein the parallel Wi-Fi network or the parallel Wi-Fi access point has a same Service Set Identifier (SSID) as the new Wi-Fi network.

19. The controller of claim 11, wherein the parallel Wi-Fi network or the parallel Wi-Fi access point has a different Service Set Identifier (SSID) as the new Wi-Fi network.

20. The controller of claim 11, wherein the determination is different depending on whether the parallel Wi-Fi network or the parallel Wi-Fi access point have a same or different Service Set Identifier (SSID) as the new Wi-Fi network.

* * * * *